Patented July 1, 1930

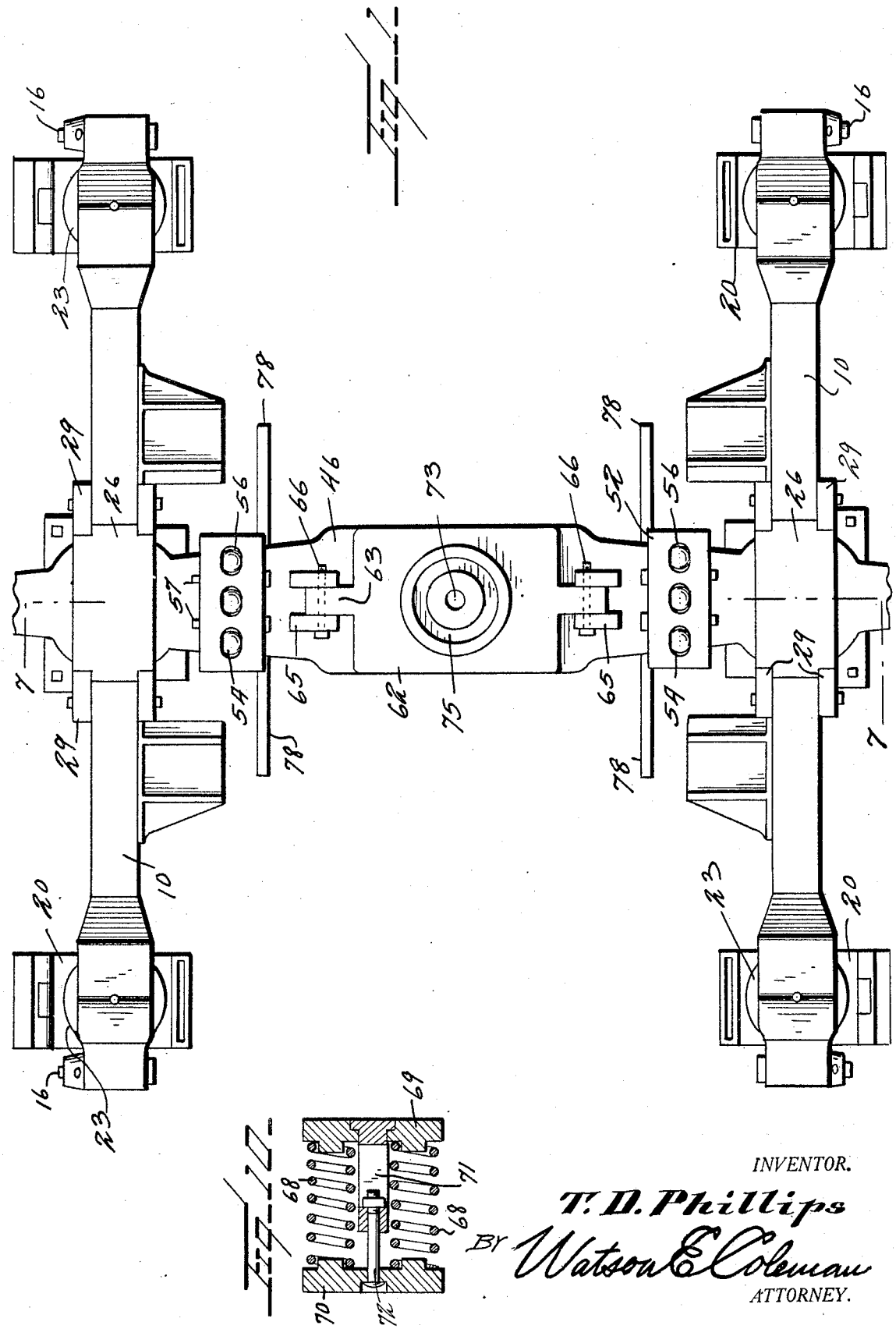

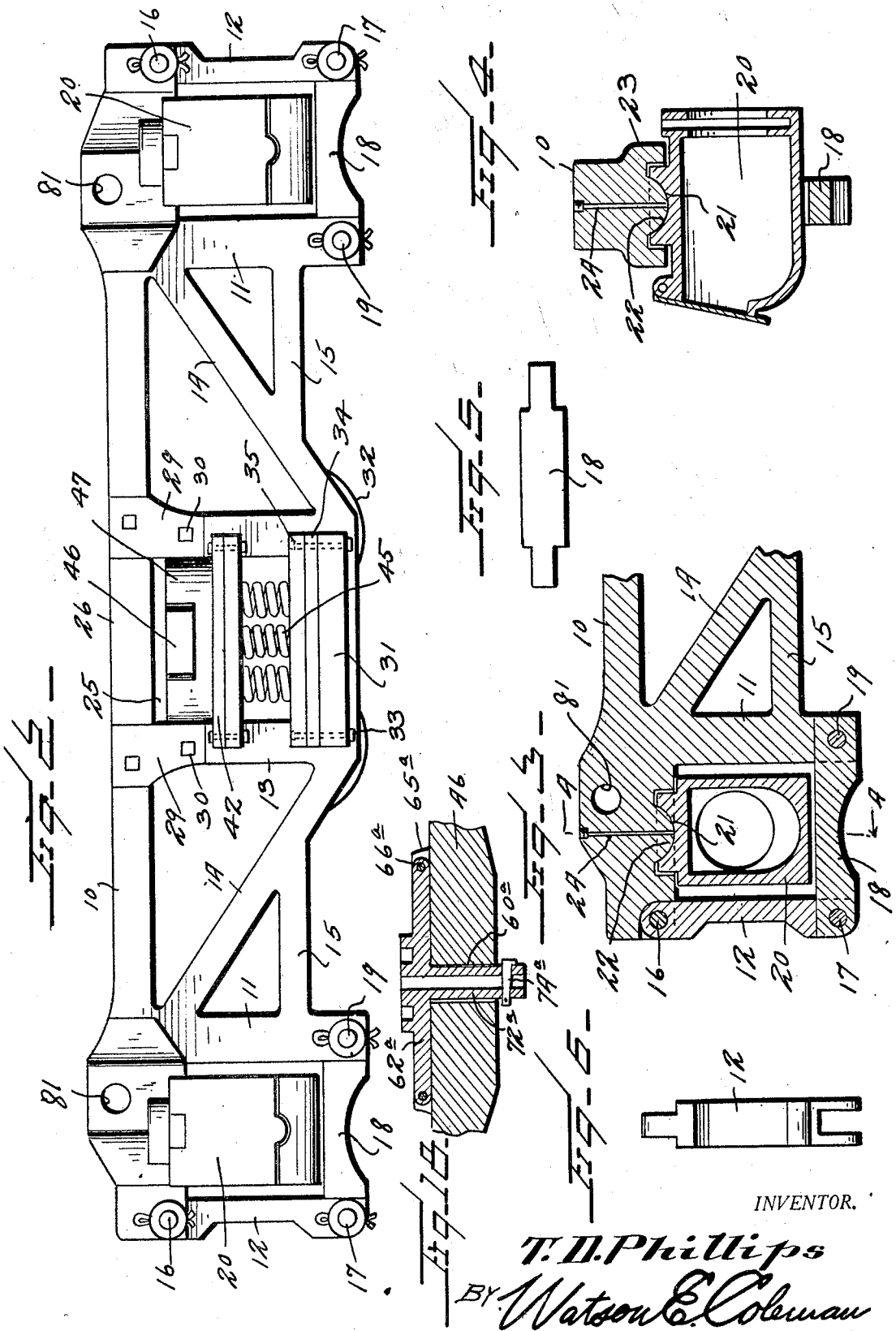

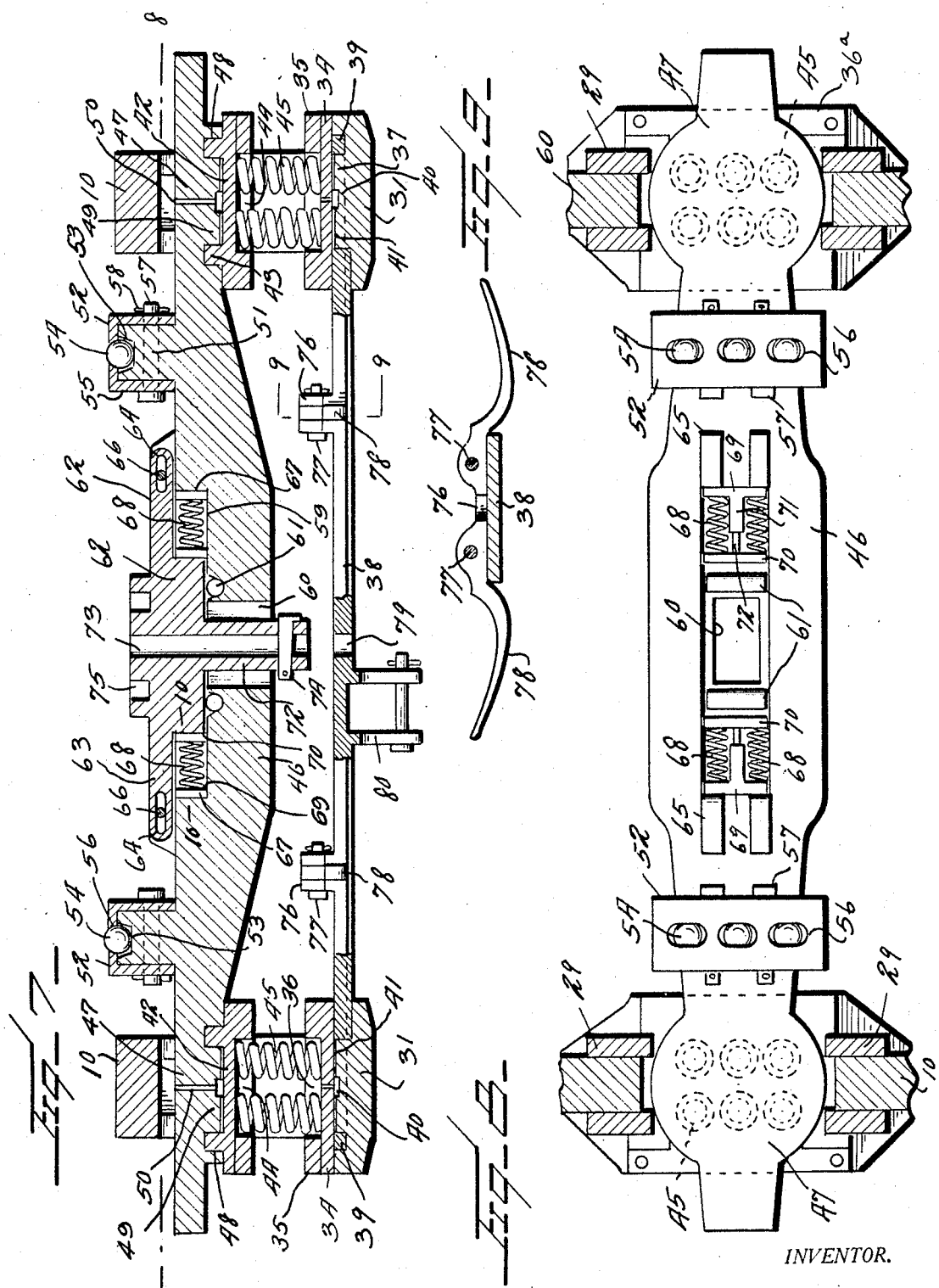

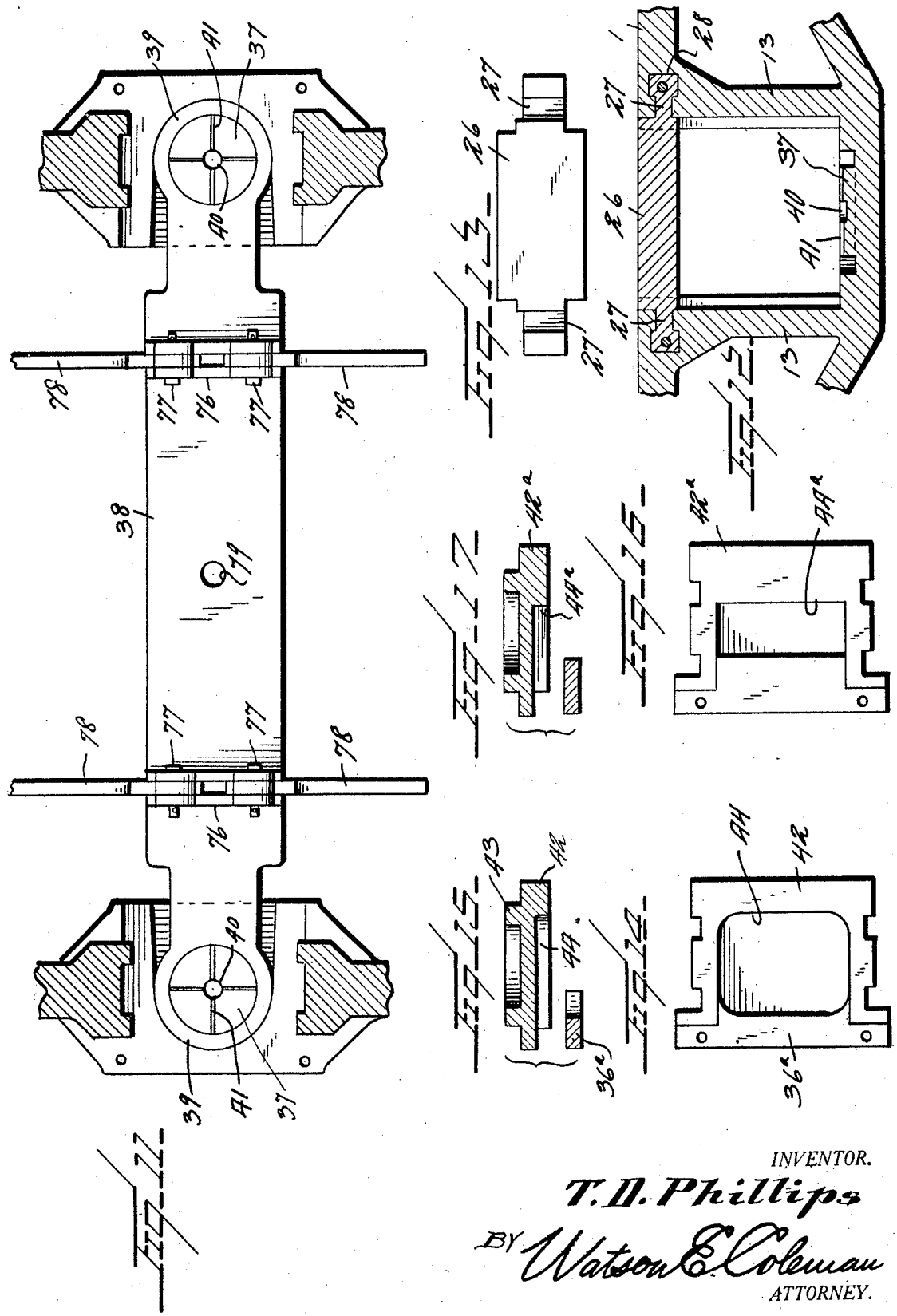

1,769,359

UNITED STATES PATENT OFFICE

THOMAS D. PHILLIPS, OF HOMINY, OKLAHOMA

FLEXIBLE CONVERTIBLE RAILROAD-CAR TRUCK

Application filed June 1, 1927. Serial No. 195,797.

This invention relates to trucks for railroad rolling stock, and particularly to trucks carrying the usual journal bearings and formed with transverse openings for the reception of spring seats and springs for the reception of a truck bolster fitted to rest upon said springs at its ends.

The general object of my invention is to provide a flexible convertible railroad car truck of such construction that the car will readily adhere to curves, low joints with short kinks in the track, and will not leave the track at these points.

A further object in this connection is to provide means which will permit a car to readily swing laterally on curves so as to reduce the strain on the flanges of the car wheels when the car is on a curve or strikes a low joint.

A still further object is to provide a truck of this construction which is easy to assemble or dismantle and in which the time necessarily used in assembling or dismantling is reduced by one-half over all other trucks known to me.

Another object is to provide a flexible truck of such construction that the length of the cars can be increased from ten to fifteen feet and still not interfere with the swinging of the car around curves.

Still another object is to provide a car truck wherein spring seats are provided so constructed that when the springs are properly applied there can be no chance for any spring to work out of place nor become loose, as is the case with all other types of truck known to me.

A further object is to provide means whereby the axle boxes may be mounted within the arch frame for rotative movement, thus securing flexibility in the connections between the axle boxes and the arch frame.

Other objects will appear in the course of the following description.

My invention is illustrated in the accompanying drawings, wherein:—

Figure 1 is a top plan view of a flexible convertible railroad car truck constructed in accordance with my invention;

Figure 2 is a side elevation of one of the arch frames;

Figure 3 is fragmentary longitudinal sectional view through one end of the arch frame and through the corresponding axle box;

Figure 4 is a fragmentary section on the line 4—4 of Figure 3;

Figure 5 is a plan view of the pedestal binder;

Figure 6 is an elevation of one of the pedestal jaws;

Figure 7 is a transverse section on the line 7—7 of Figure 1;

Figure 8 is a section on the line 8—8 of Figure 7.

Figure 9 is a fragmentary section through the spring plate on the line 9—9 of Figure 7;

Figure 10 is a horizontal section on the line 10—10 of Figure 7;

Figure 11 is a plan view of the spring plate, portions of the arch bar being in section;

Figure 12 is a fragmentary longitudinal section through the middle portion of the arch bar showing the means whereby the compression member is engaged with the arch bar;

Figure 13 is a top plan view of the compression member;

Figure 14 is a top plan view of a bolster spring supporting plate used where coil springs are used for supporting the bolster;

Figure 15 is a sectional view of the plate and of the cross bar forming the same;

Figure 16 is a top plan view of another form of plate adapted for use with elliptical springs;

Figure 17 is a cross sectional view thereof, the cross bar being separated therefrom and in section;

Figure 18 is a fragmentary longitudinal section through the middle of a bolster showing a rigid center plate thereon.

Referring to these drawings, it will be seen from Figures 1 and 2 that the truck consists of the laterally disposed arch frames 10. There are two of these frames as usual, and each frame at its ends is formed with the pedestal jaws 11 and 12, the pedestal jaw 11 being fixed and the pedestal jaw 12 being pivotally connected to the extremity of the frame, as will be later stated. The truck columns 13 which define an opening for the bolster and its supporting means are braced by the tie members 14 and the brace 15. I do not wish to be limited to the particular form of the arch frame except as hereinafter stated.

The pedestal jaws 12 are pivoted at their upper ends upon removable transverse pins 16 and at their lower ends are detachably connected, as by the pins 17, with a pedestal binder 18 which is also detachably engaged with the pedestal jaw 11 by means of the pin 19. The lower ends of the pedestal jaws are bifurcated and the ends of the binder reduced, as shown in Figure 5, to fit in these bifurcated ends. Disposed between the pedestal jaws and having lateral oscillation therein are the axle boxes 20 of any usual or suitable shape, these axle boxes being formed on their upper walls with the concave seats 21. The under face of the arm frame between the pedestal jaws is formed with the downwardly protuberant, hemispherical boss 22 fitting in this concave seat 21, and with a circular flange 23 which encircles the circular flange which defines the cup or concavity 21. Thus it will be seen that the arch frames have oscillatory engagement with the axle boxes so as to permit the axles to flex within the arch frames.

Preferably the arch frame is formed with an oil hole 24 and this oil hole may extend downward through the axle box and downward into the ball joint. If this opening is extended downward through the journal box and through the wedge that rests upon the journal bearing, and if this perforation also extends through the journal bearing, then in case the journal runs hot the hard oil or grease used for lubricating the axle box within the arch frame will melt and run onto the journal bearing.

The truck columns 13 define between them an opening 25 for the reception of the ends of the truck bolster. This opening is closed at its top by a compression member 26 (see Figure 12), this compression member being provided with relatively narrow, dove-tailed portions 27 fitting within dove-tailed recesses 28 formed in the upper ends of the truck columns. These relatively narrow ends 27 of the compression member are held in place within the horizontal web of the arch by means of the side plates 29, which in turn are held in place by transverse bolts 30. The floor of the bolster opening 25 is formed by a web 31 which extends out laterally wider than the width of the arch itself and which is reinforced by the reinforcing protuberance 32 (see Figure 2).

Resting upon and bolted to this web 31 by bolts 33 is a spring seat. If coiled springs are used for supporting the bolster, the spring seat 34 which has an upper face substantially the same as the under face of the spring seat or bolster plate 42 shown in Figure 14 is used. If, on the other hand, elliptical springs are used, a bottom spring seat plate 42$^a$ having substantially the form shown in Figure 16 is used. The spring seat 34, as well as the spring seat 42$^a$, is formed of a casting open at one end but closed by a filler block 35. The bolts 33 pass downward through this filler block and the filler block is removable to permit the introduction of the springs into the spring seat or depression 36. The upper face of the web 31, as shown in Figure 7, is formed with an upwardly extending, circular boss 37 and the spring seat 34 is so spaced from the web 31 as to permit the introduction into the space below the spring seat 34 of the end of the spring plank or tie bar 38, as shown in Figure 7. This tie bar at its extremity, as shown in Figure 11, is formed with an annular head 39 which surrounds and has rotative movement upon the boss 37. This boss 37 is formed with a central opening 40 for the reception of lubricant and with radial passages 41 for conducting the lubricant to the circumferential face of the boss. By removing the spring seat or plate 34, the extremity of the spring plank 38 may be engaged over the boss 37, then when the spring plate 34 is put back in place it will hold the spring plank in engagement with this boss so that the spring plank will have rotative engagement with the bottom web 31 of the arch frames.

Also mounted between the pedestal jaws is an upper bolster plate 42, the upper face of this plate being formed with the annular flange 43 which is adapted to engage a correspondingly formed depression on the bolster, as will be later stated. The under face of this bolster plate is formed with a recess 44, and disposed between the bottom spring plate 34 and this bolster plate 42 are the springs 45. These springs may be helical springs, as shown in the drawings, or elliptical springs as heretofore stated. The bolster plate 42 (or 42$^a$), as shown in Figures 14 to 17, is formed either with a relatively large recess 44 which will carry the six coiled springs 45 or is formed to provide a relatively narrow recess 44$^a$, as shown in Figure 16, to support elliptical springs. This recess is closed at one side by the removable member 36$^a$. By providing the two castings for the bottom spring plate and providing a bolster plate in the two forms 42 and 42$^a$, it is possible to convert the construction from one wherein the bolster is supported by eliptical springs to one wherein the bolster is supported by coiled compression springs.

The bolster is designated 46 and, as illustrated in Figures 7 and 8, the bolster at its ends extends through the openings 25 in the arch frames and has rotative engagement with the bolster plate 42, as shown best in Figure 7. To this end the extremities of the bolster 46 are enlarged, as at 47, and each enlarged end 47 of the bolster is formed upon its under face with the circular recess 48 which receives and rotates upon the annular flange 43, this recess 48 defining a central boss 49 which extends down into the central circular recess defined by the flange 43. An oil hole 50 extends downward through the top of the bolster and discharges oil or grease upon the lower face of the boss 49. It will thus be seen that the spring plank 38 and the bolster are both mounted at their ends for rotative movement in horizontal planes around common axes which extend up through the center of the bolster openings 25 in the arch frame.

The bolster is formed adjacent each end with the upwardly projecting boss 51 over which extend the boxes 52. The upper face of the boss 51 is formed with a plurality of recesses 53, and disposed in these recesses are the three balls 54. A cover or casing 55 fits over each boss and has a plurality of elongated slots 56 which fit over the balls 54 and hold the balls in place. Each cover is held to its upwardly extending boss by means of the pins 57 held in place by transversely extending cotter pins 58. The car or other body which rests upon the bolster is supported upon these balls for rotative movement and for sliding movement, as will be later stated.

As illustrated in Figure 7, the center of the bolster is formed with a recess 59 and extending downward from this recess is the central opening 60 which is relatively large. Disposed adjacent this central opening and on each side thereof are the anti-friction rollers 61. Mounted in this recess 59 is a center plate 62 having prolongations 63 which are longitudinally slotted, as at 64. Disposed on each side of these tongues 63 are the ears 65 and passing through the tongues and the ears are pins 66.

Thus it will be seen that the center plate can have sliding movement longitudinally of the bolster to an extent limited by the length of the slots 64. Disposed within the recess 59 and operatively bearing against the wall 67 of the boltser are the compression springs 68 which, as illustrated in Figure 10, bear at their ends against the spring seats 69 and 70. These spring seats are connected by a telescopic shackle consisting of the tongue 71 and bolt 72 which passes through the extremity of the tongue. Thus the seats may move toward or from each other and these seats bear respectively against the end wall of the recess 59 and against the end wall of the downwardly protuberant portion 62 on the center plate. The aperture 60 is sufficiently large so that the downwardly extending sleeve 72 of the center plate will pass through the aperture 60 and have free oscillation therein longitudinally. The center plate and the sleeve 72 have a central passage 73 for the passage of the center pin on the car. This center pin extends down through the passage 73 and is engaged with the sleeve 72 by means of the transversely extending pin 74 which at its extremity is apertured for the passage of a cotter pin so as to hold the center pin on the car in engagement with this center plate. The center pin on the car is thus held from detachment and the car can shift laterally with the center plate when the car is passing around curves, the body of the car being supported by the balls 54. Preferably the center plate is also formed with the annular channel 75 and the car is provided with a downwardly extending boss which engages in this channel. This downwardly extending annular boss and the center pin are not shown, as these are common in car construction and form no part of my present invention.

As illustrated, the tie bar or spring plank 38 is formed in three sections to provide the upwardly extending flanges 76, between which are mounted by the bolts 77 the outwardly and downwardly curved brake safety guards 78. The middle of the spring plank is formed with an aperture 79 coinciding with the passage 73 for the center pin and to one side of this aperture 79 there are provided the downwardly extending ears 80 constituting the bottom brake connecting rod safety guard. The brake safety guard and the brake connecting rod safety guard are common and well known and, therefore, no further description need be given to these parts.

While I have heretofore shown and described the center plate with its annular channel 75 and its center pin passage 73 as being removably mounted upon the bolster and as being mounted for sliding movement in opposite directions, I do not wish to be limited to this as this center plate might be mounted upon the bolster so that it cannot shift laterally against the actions of the spring 68 but is rigidly engaged with the bolster, or the bolster itself might be formed with the channel and the passage 73 for the center pin. It is possible also to construct this bolster so that with the same bolster either a removable and slidable center plate may be used, as illustrated in Figure 7, or a relatively fixed center plate be used which would not slide laterally. A bolster with a relatively fixed center plate which cannot slide laterally is illustrated in Figure 18.

It will be seen that a truck constructed in accordance with this invention is convertible and is so constructed that the truck is flexible and will readily stay upon the rails even on sharp curves or where the track has low joints and relatively short kinks. The car body can readily swing laterally with reference to the truck to thus eliminate strain on the flanges of the car wheels when the car strikes a curve or low joint. The truck is very easily assembled or disassembled and is applicable to coaches, freight cars, tank cars, interurban and street cars, and the structure is also applicable to the pony trucks used in connection with locomotives. The spring seats, whether for the coiled compression springs or the elliptical springs, are so constructed that when the springs are properly applied, there can be no chance for the spring to work out or become loose. By using a flexible truck constructed in accordance with my invention, the length of cars may be increased without interfering with the proper swinging of the car trucks around curves.

It is also to be noted that by the use of the spring plates 42 and 42ª and corresponding spring plates 34 that the truck is rendered convertible, or in other words by interchanging these spring plates either coiled springs may be used under the ends of the bolster or elliptical or flat springs may be used. Thus freight car springs or coach truck springs may be used as desired, and the truck is applicable to either class of rolling stock. With this construction, when a car hits a curve, the center plate 62 will readily swing off of center and as the car begins to approach the straight track the compressed springs will gradually push the car back onto center again. I have provided a truck that can be changed from a freight car to a coach car or from a coach car to a freight car as desired. It will be seen that the key 74 supports the center pin but permits this center pin to be removed through the bottom of the truck.

The center pin of the car is removable from the bottom of the car while the car is resting on the bolster. By having the center pin removable in this manner, the car body does not require to be raised so high in order to remove the trucks. While I have illustrated in Figure 7 a center plate which is not only removable but is held on the center by springs, yet under some circumstances it may not be desirable to use a flexible or shiftable center plate, and in Figure 18 I have illustrated a center plate 62ª which is mounted upon the bolster 46 for removal therefrom but is held from any sliding movement. The bolster has a central opening 60ª and the center plate 62ª has a centrally disposed sleeve 72ª which extends down through this opening 60ª. The center plate is removably held by the pin 66ª passing through the ends of the center plate and through the lugs 65ª. The lower end of the sleeve is intersected by the pin 74ª, as previously described. Preferably this center plate 62ª is removable, as if in any way it should become broken it may be removed without requiring the necessity of replacing with a whole new bolster. I do not wish to be limited to this, however, as the center plate might be made integral with the bolster.

While I have illustrated the arch bar or truck frame as being made of a plurality of parts, I do not wish to be limited to this, as the arch bar or truck frame might be made solid.

In Figure 2, I illustrate the ends of the arch bar or side frame as being formed with openings 81 for engagement with safety chains. Passenger coaches and engine tanks are equipped with four safety chains to each truck in order to prevent the truck from getting from under the coach or tank in case of derailment.

While I have illustrated certain details of construction and arrangement of parts, I do not wish to be limited necessarily to these details, as obvious changes might be made without departing from the spirit of the invention. Furthermore, it is to be understood that the arch bar, the bolster and the spring plank are to support all of the usual auxiliary appliances necessary for the proper operation of the brakes, etc.

I claim:—

1. A car truck having arch frames each formed at its middle with a bolster opening, a bolster having its ends disposed within said openings, spring plates removably disposed upon the floors of said openings, bolster plates removably disposed within said openings and upon which the bolster rests and has rotative engagement, and springs disposed between the plates, the plates being recessed on their confronting faces to form spring seats, said seats holding the springs in place, one wall of the recess of each plate being removable.

2. A car truck having arch frames each formed at its middle with a bolster opening, a bolster having its ends disposed within said openings, spring plates removably disposed upon the floors of said openings, bolster plates removably disposed within said openings and upon which the bolster rests, and springs disposed between the plates, the plates being recessed on their confronting faces to form spring seats, said seats holding the springs in place, one wall of the recess of each plate being removable, the bolster plates and bolster having complementary annular grooves and flanges whereby the bolster may have swinging movement upon the bolster plates.

3. A car truck having arch frames each formed at its middle with an opening for the ends of the bolster and for the ends of a spring plank, a bolster having its ends disposed within said openings, a spring plank having its ends disposed within the openings, bolster plates upon which the bolster rests, spring plates disposed above the ends of the spring plank, the plates being recessed on their confronting faces, springs seated in said recessed portions of the plates and holding the plates apart. The bolster having enlarged circular end portions and the openings in the arch for receiving the end of the bolster plate having lateral walls, and removable members holding the circular ends of the bolster from lateral displacement, bolster plates having vertical sliding engagement with the walls of said openings and having rotative engagement with the adjacent ends of the bolster, and springs between the spring plates and the bolster plates, the spring plank having rotative engagement with the lower wall of the opening in each arch frame.

4. A car truck having arch frames, each frame being formed to provide truck columns defining a medially disposed bolster-receiving opening, the ends of the frame being formed with pedestal jaws and pedestal binders defining an axle box opening, axle boxes mounted in said openings for rotation in horizontal planes, detachable plates mounted between the truck columns of the arch frames for vertical movement, springs disposed between said plates, a bolster rotatably supported upon but having interlocking engagement with the uppermost plates of the two arch frames, and a spring plank having its ends disposed below the lowermost plates and having rotative engagement with the lower walls of the bolster openings, the bolster being provided with means for rotatably supporting a car body and having anti-friction bearings with which the car body may engage.

5. A car truck having arch frames, each formed at its middle with a bolster opening, a bolster having its ends disposed within said openings, spring plates removably disposed upon the floors of said openings, bolster plates removably disposed within said openings and upon which the bolster rests, and springs disposed between the plates, the plates being recessed on their confronting faces to form spring seats, the bolster plates and bolster having complementary annular grooves and flanges whereby the bolster may have swinging movement upon the bolster plates.

In testimony whereof I hereunto affix my signature.

THOMAS D. PHILLIPS.